(12) United States Patent
Christensen

(10) Patent No.: US 6,766,643 B2
(45) Date of Patent: Jul. 27, 2004

(54) WIND AND WAVE ENERGY PLANT

(76) Inventor: Henrik Frans Christensen, Guldbergsgade 9, Copenhagen N, Denmark DK-2200 (DK)

( * ) Notice: Subject to any disclaimer, the term of this patent is extended or adjusted under 35 U.S.C. 154(b) by 0 days.

(21) Appl. No.: 10/240,544

(22) PCT Filed: Apr. 3, 2001

(86) PCT No.: PCT/DK01/00222
§ 371 (c)(1),
(2), (4) Date: Oct. 2, 2002

(87) PCT Pub. No.: WO01/75302
PCT Pub. Date: Oct. 11, 2001

(65) Prior Publication Data
US 2003/0145587 A1 Aug. 7, 2003

(30) Foreign Application Priority Data
Apr. 3, 2000 (DK) ........................................ 2000 00550

(51) Int. Cl.$^7$ ............................................... F16D 31/02
(52) U.S. Cl. ............................. 60/398; 60/329; 60/499; 60/506; 290/53
(58) Field of Search ...................... 60/398, 329, 456, 60/506, 499; 290/53, 55, 42, 44

(56) References Cited

U.S. PATENT DOCUMENTS

| | | |
|---|---|---|
| 3,988,592 A | 10/1976 | Porter |
| 4,204,406 A | 5/1980 | Hopfe |
| 4,279,124 A | 7/1981 | Schremp |
| 4,421,990 A | 12/1983 | Heuss et al. |
| 4,495,424 A | 1/1985 | Jöst |
| 5,549,445 A | 8/1996 | Schremp |
| 6,100,600 A | 8/2000 | Pflanz |
| 6,227,803 B1 * | 5/2001 | Shim ........................... 416/44 |

FOREIGN PATENT DOCUMENTS

| | | |
|---|---|---|
| DE | 3620454 A1 | 12/1987 |
| DE | 197 14512 A1 | 10/1998 |
| EP | 1 045 138 A2 | 10/2000 |
| FR | 2 501 795 | 3/1981 |
| GB | 2 154 668 A | 9/1985 |
| GB | 2 312 253 A | 10/1997 |
| JP | 59137292 | 8/1984 |
| SE | 507 205 | 4/1998 |
| WO | WO 94/0927 | 4/1994 |
| WO | WO 95/08060 | 3/1995 |
| WO | WO 98/26177 | 12/1997 |

OTHER PUBLICATIONS

DN1170798, Jan. 21, 1988 Cai Chunlin, Abstract.

* cited by examiner

*Primary Examiner*—Edward K. Look
*Assistant Examiner*—Michael Leslie
(74) *Attorney, Agent, or Firm*—Sughrue Mion, PLLC

(57) ABSTRACT

A wind and wave energy plant (1) comprises a windmill with a rotor (3) and a wave-actuated water pump that can drive a turbine whose output shaft is in driving connection with an electric generator. The windmill includes a tubular mill tower (2), which is firmly anchored to the seabed and encloses a storage tank between the sea surface and the mill rotor (3), which tank can be filled with water by means of the pump via a non-return valve, and from which water can be led to the turbine.

19 Claims, 4 Drawing Sheets

WIND AND WAVE ENERGY PLANT

Figure 1:
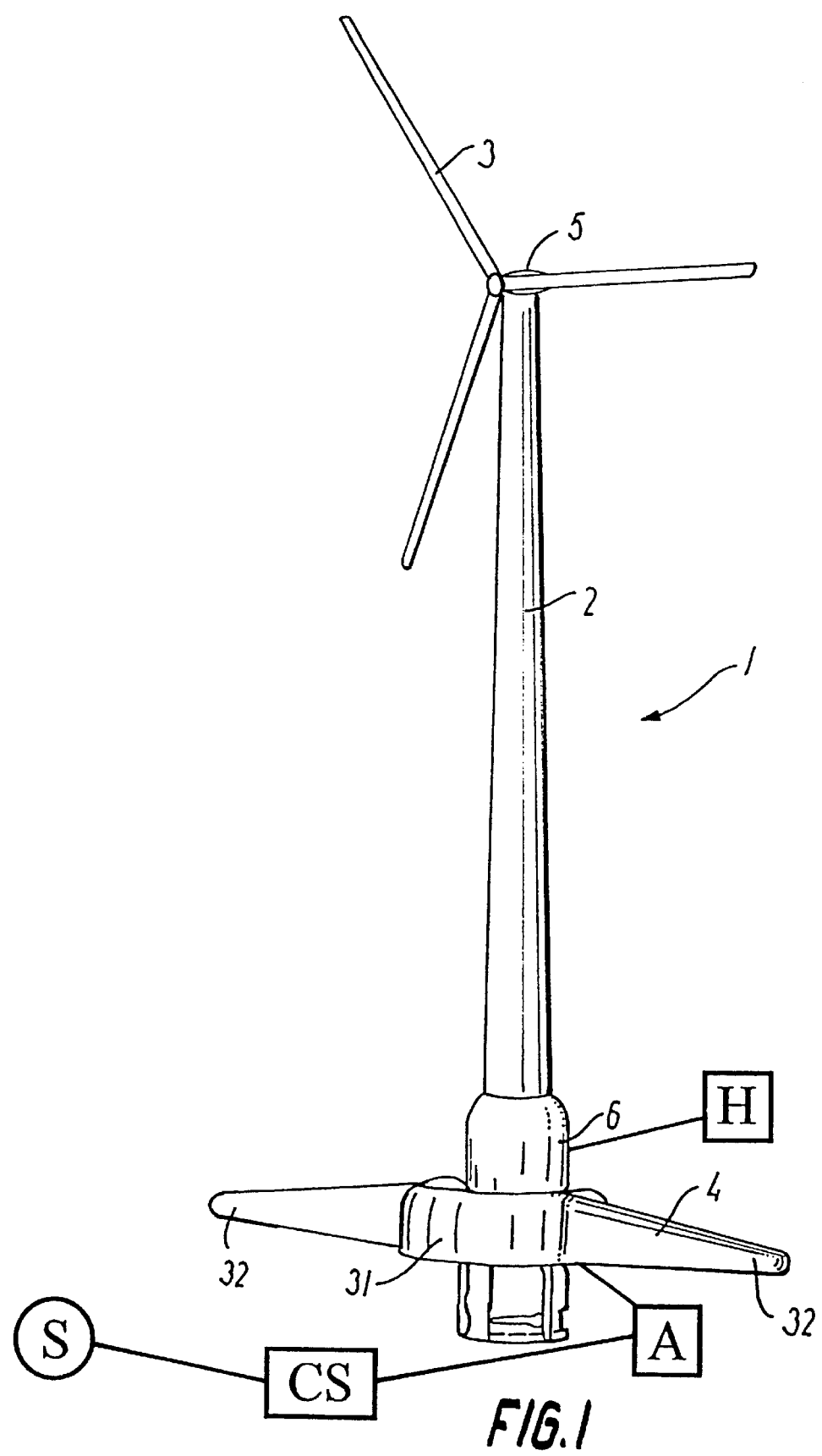

The present invention relates to a wind and wave energy plant, comprising a windmill with a rotor and a wave-actuated water pump that can drive a turbine whose output shaft is in driving connection with an electric generator.

U.S. Pat. No. 5,549,445 describes a seagoing platform for wind and wave energy extraction, in which a turbine chamber open downwards is encircled by an annular pontoon. Around the pontoon, a large number of wave-actuated pumps are arranged, driven by submerged driving means and sucking water out of the turbine chamber so that the water rises up through the chamber and thus passes an electric generator with associated turbine submerged in the chamber. Above the turbine an impeller wheel is moreover arranged in the chamber, driven directly by a vertical-axis windmill and thus also pumping water up through the chamber past the turbine. The water which passes this impeller wheel is discharged to the surroundings through openings in the upper part of the turbine chamber wall.

In plants for extraction of energy from wind and waves, the final price of the energy produced depends partly on the construction costs and partly on the overall efficiency. The known plants are generally rather complex and therefore expensive to construct, and moreover the efficiencies achieved are not optimum.

The object of the present invention is to provide a wind and wave energy plant of a more simple design and yielding a higher output than prior-art plants.

In view of this object, the plant is characterized in that the windmill includes a tubular mill tower, which is firmly anchored to the seabed and encloses a storage tank between the sea surface and the mill rotor, which tank can be filled with water by means of the pump via a non-return valve, and from which water can be led to the turbine.

In this way it is possible by means of one and the same member, namely a firmly anchored mill tower, to achieve a combination of two substantial advantages, namely better utilization of the wind energy, as the mill rotor is raised to a height with strong winds, and at the same time better utilization of the wave energy, as by pumping seawater into the mill tower and storing the water there it is possible to achieve such a large pressure drop across the turbine wheel that the efficiency of the turbine is substantially higher than in the prior-art plants, for example up to approximately 20%. Thus a greater energy production can be achieved without extra costly structural members, such as separate foundations for a windmill and a wave energy plant, or more, larger pumps.

Furthermore better quality of the power produced can be achieved as the number of revolutions of the turbine can be kept substantially constant regardless of the fact that the water flow from the wave-actuated pump may vary depending on the velocity of propagation and size of the waves. A varying water flow from the pump is equalized by a buffer effect caused by the stored water volume in the storage tank. The generator, which is driven by the turbine, can consequently supply power at a more uniform frequency and voltage, which is a substantial quality parameter.

In an advantageous embodiment, the storage tank is elongated and extends substantially from the area around the sea surface to the area at the rotor. In this way largely the entire length of the mill tower can be utilized for obtaining a large pressure drop across the turbine with consequent high efficiency and at the same time a large volume of stored water, which enables the turbine to operate particularly evenly.

In a structurally particularly advantageous embodiment, the mill tower is constituted by a slender pipe which in itself forms the wall of the storage tank, thereby saving materials for making a separate storage tank in the tower, the tower merely having to be closed at the bottom.

The turbine and the associated electric generator may advantageously be arranged in the mill tower under the storage tank. This allows the turbine inlet to be arranged in immediate continuation of the storage thank, thus achieving particularly favourable flow conditions at the inlet, which results in further improvement of the efficiency as well as uniform operation. This furthermore obviates the need for a separate housing for the turbine and the generator, and these components are particularly well protected against the weather in the mill tower, as, owing to its height, it must be of heavy dimensions. Thus, a particularly reliable function is made possible.

The pump and the non-return valve may also preferably be integral with the mill tower, thus providing short flow paths with consequently smaller losses and furthermore a simple and robust structure.

In a particularly compact embodiment, the mill tower has a foot section in which the turbine and the generator are arranged centrally in continuation of each other, and in which a cast foundation for the mill projects centrally in an upward direction, and the pump is a piston pump with one or more pistons capable of reciprocating in an area enclosing one or more of the members: turbine, generator or foundation. In this way the turbine inlet can be placed near the surface level of the sea, which renders possible a larger head of water over the turbine while the pistons of the pump can have a suitably long stroke, being arranged on a level with the turbine, the generator or the foundation in the direction of height of the mill tower. As the pump pistons are thus located peripherally in the mill tower immediately inside its outer wall, they can be connected in a simpler way with wave-actuated driving means located outside the tower.

In a preferred embodiment the pump piston or pistons may be moved by a wave-actuated elongated driving means, such as a float, which extends substantially in a diametrical direction in relation to the tower, and which is journalled rotatably around the longitudinal axis of the tower at the foot section of the tower. In this way the driving means can rotate in relation to the incoming waves depending on their direction of propagation so that the longitudinal axis of the driving means is substantially parallel with the wave crests, whereby substantially the largest part of the wave energy is transmitted to the driving means, which is influenced by an even upward force along its entire length. By journaling the driving means around the longitudinal axis of the tower, it can be connected in a simple and robust manner with pump pistons located inside the tower. Another advantage obtained is that the driving means is influenced by an extra water rise occurring through the deceleration of part of an incoming wave, as the latter hits the foot section of the mill tower and the foundation located below it.

The driving means may further be in the form of a float which in the area around the tower has a particularly large buoyancy volume allowing better utilization of the extra water rise mentioned above.

In an advantageous embodiment, the plant includes a sensor for recording the direction of propagation of the waves, and a control system for adjusting the driving means in relation to the recorded direction and by means of a preferably electric actuator, so that the longitudinal axis of the driving means is substantially parallel with the wave crests. This allows the orientation of the driving means to be optimized in relation to the direction of propagation of the waves so that the driving means is influenced by the largest possible upward force from the wave crests. Furthermore, the driving means then need not be formed so that it adjusts stably to the direction of the waves by itself; an area with a particularly large buoyancy volume may, for example, by means of the actuator, be held constantly at the side of the mill tower that faces the incoming waves.

The foundation of the tower may have a downwardly increasing diameter below the sea surface. This may cause enhancement of the extra water rise that occurs by deceleration of an incoming wave, as the foundation may form an upward ramp for the waves.

In one embodiment, the part of the external wall located at the sea surface is made of metal, and means for electrical heating of this part of the outer wall are included. In this way, ice can be melted which may otherwise in some cases inhibit the, function of the driving means or damage the tower if ice packing occurs.

Figure 2:
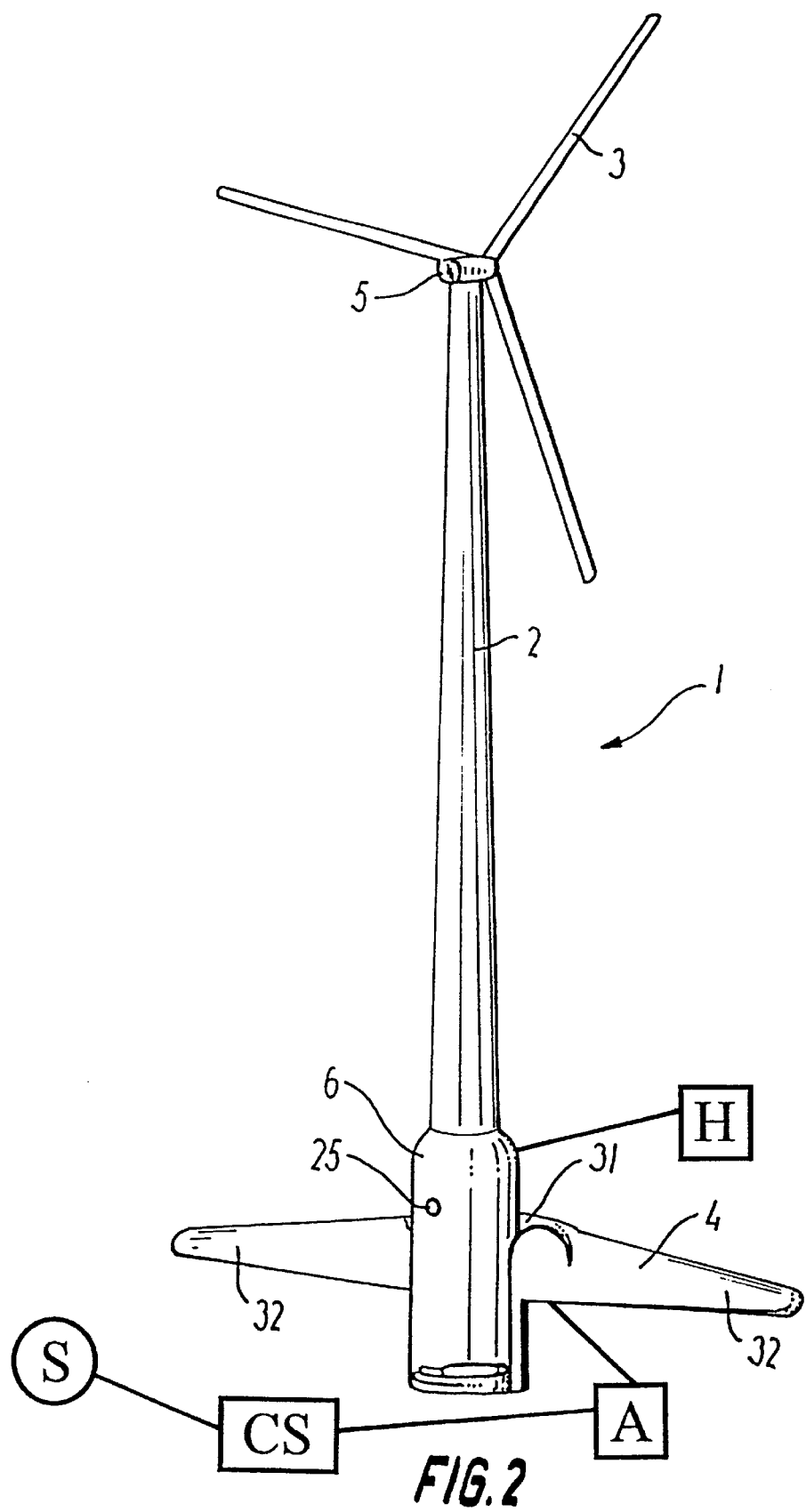
Figure 3:
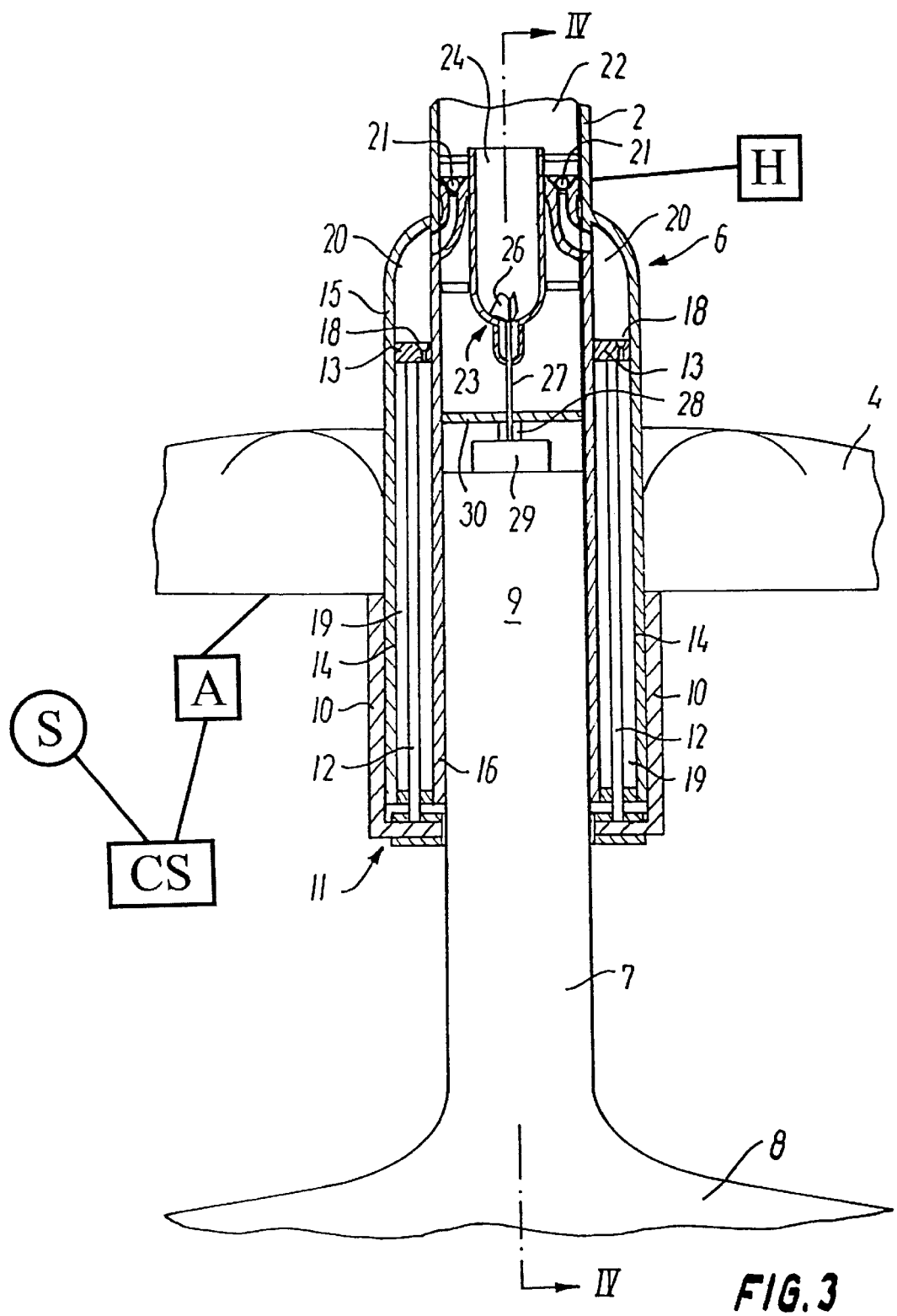
Figure 4:
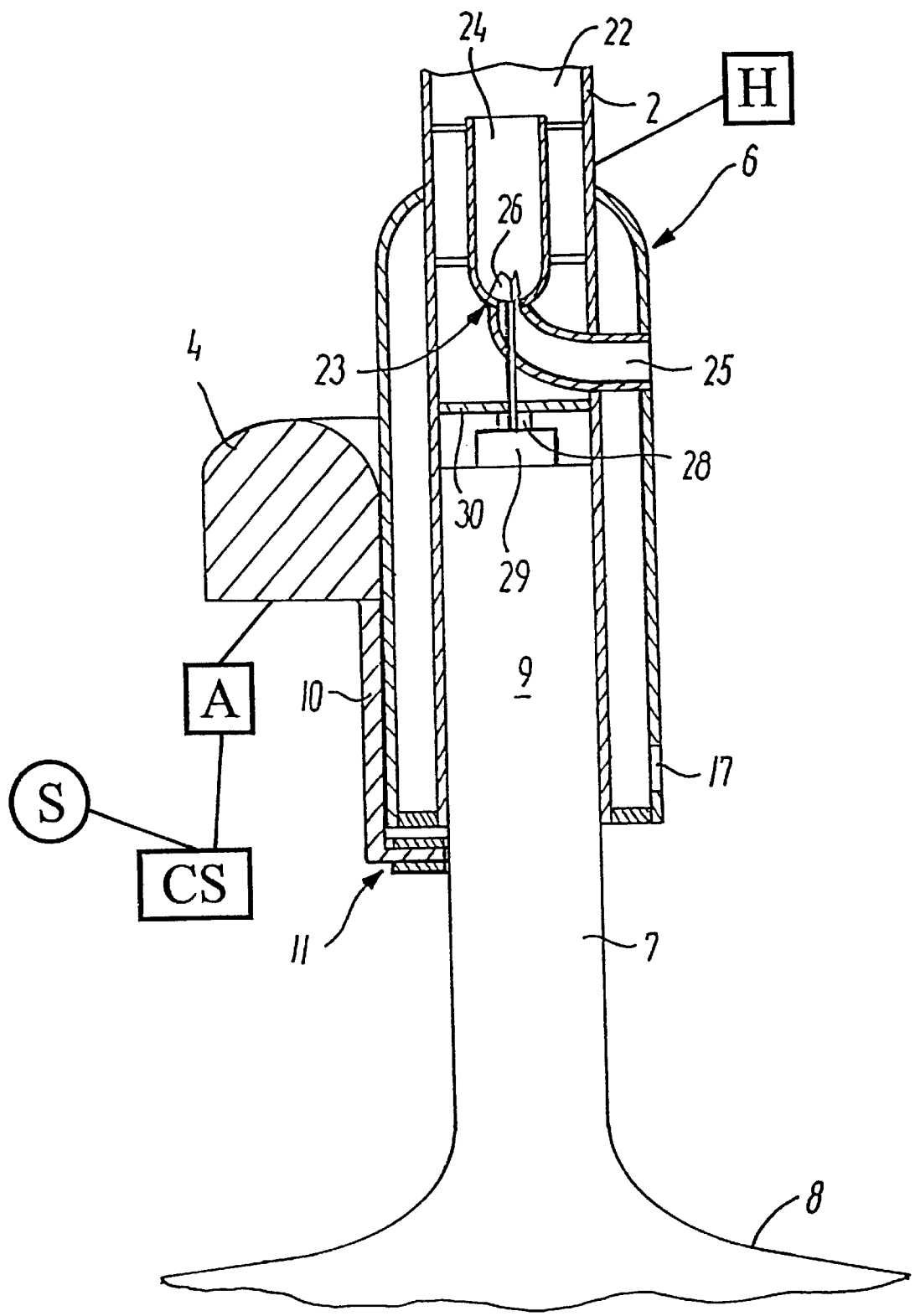

The invention will now be described in further detail below by means of examples of embodiments and with reference to the schematic drawing, in which FIG. 1 gives a perspective view of a wind and wave energy plant according to the invention, FIG. 2 shows the wind and wave energy plant of FIG. 1 seen from another angle, FIG. 3 illustrates a partially axial section through the plant of FIG. 1, and FIG. 4 illustrates a partially axial section through the plant along the line IV—IV in FIG. 3.

FIG. 1 shows a wind and wave energy plant 1 for anchoring on the seabed, including a tubular mill tower 2, a mill rotor 3 and an elongated float 4. The mill rotor 3 is a so-called HAWT (Horizontal Axis Wind Turbine), whose horizontal shaft drives an electric generator 5 arranged at the top of the tower 2. The mill tower 2 may be made of steel, and may, for example, be 100 meters high, the mill generator 5 being of, for example, 2 MW. However, the plant can be built in many different sizes. At the bottom, the tower 2 has a foot section 6, shown in an axial section in FIG. 3.

FIG. 3 shows the foot section 6 mounted on the seabed by means of a cast concrete foundation 7, which has an upper cylindrical section 9 projecting a distance into the foot section. The foundation 7 further has a lower section 8 in which the diameter increases downwards so that waves moving towards the foundation are pressed upwards towards the float 4. The height of the foundation can be adapted to the water depth on the site. The anchoring further allows the tower to be filled with water and the large upward forces on the float 4 to be utilized for energy production.

The float 4, which is only partially shown in FIG. 3, is journalled around the foot section 6 so that it can turn around the longitudinal axis of the mill tower and be displaced up and down, floating on passing waves. By means of several vertically extending holding arms 10, and via a rotational bearing 11 arranged at the bottom of the foot section, the float 4 is connected with several vertically displaceable pump rods 12 located inside the foot section and having associated pump pistons 13. The bearing 11 extends all the way round the cylindrical section 9 of the concrete foundation so that the float 4 can turn around the vertical axis of rotation of the bearing into any angular position, and may, for example, be formed as a roller bearing, known per se. According to the actual geographical location of the plant, the holding arms 10 and the pump rods 12 are dimensioned suitably long so that the float 4 can move sufficiently far up and down with the waves to be able to optimize the energy utilization under most of the weather conditions that occur.

Each pump piston 13 is journalled in a vertically displaceable manner in a pump cylinder 14 arranged in an annular area between a peripheral outer wall 15 of the foot section 6 and an inner pipe 16, which is an extension of the actual mill tower 2. The pump piston thus divides the cylinder 14 into a lower pump chamber 19 and an upper pump chamber 20. In a first pump cycle, the pump pistons 13 first move upwards because of a wave passing the tower which lifts the float 4, and thereby water is sucked from the sea through non-return valves, not shown, into each cylinder in the lower pump chamber 19 under the piston. The water may, for example, be sucked in through an opening 17, shown in FIG. 4, of the outer wall 15. When the wave crest moves away from the tower, the float moves downwards under the influence of its own weight, whereby the pistons 13 are brought along downwards in their cylinders 14. In each piston 13, a non-return valve 18 is arranged, permitting water to flow from the lower pump chamber 19 to the upper pump chamber 20, but not in the opposite direction. At the downward piston movement, the water therefore flows from the lower to the upper pump chamber. At the subsequent pump cycles, water is pumped out of the upper pump chamber 20 at each upward movement of the pump piston via a non-return valve 21 and into a storage tank 22 constituted by the hollow part of the mill tower 2 located above the foot section 6, while water is sucked into the lower pump chamber 19. In general, one or more pumps may be used, and they can be designed in many different ways, and the non-return valves may be located differently and be of various known types.

At continued operation of the pump pistons 13, the storage tank in the mill tower 2 can be filled wholly or partially with water building a relatively high water pressure at the bottom of the mill tower, for example 10 to 12 bar in relation to the surroundings. The storage tank 22 may possibly be closed at the top so that there is an air volume, which becomes compressed as the tower fills, above the water surface in the tower. This makes it possible to create an even higher pressure in the storage tank. At the bottom of the storage tank 22, a turbine 23 is arranged centrally in the tower pipe 2 with an inlet 24 which is open up into the storage tank, and an outlet 25 which is open to the surroundings through the side wall 15 of the foot section 6, see FIG. 4. The turbine has blades 26, which turn a turbine shaft 27, which, via a gear 28, drives an electric generator 29 which may, for the plant shown, be of 3 MW. The turbine shaft extends vertically down through a sealing partition 30, which protects gear and generator against water. In the embodiment shown, the generator is arranged above the concrete foundation 7, but it might also be located in a recess therein, possibly together with gear and/or turbine.

Owing to the large pressure drop across the turbine in relation to prior-art plants where no storage tank is used, a high-pressure turbine, such as a so-called Francis turbine, can be used, which has a substantially higher efficiency than a low-pressure turbine, which is used in prior-art plants. The large volume of water that can be stored in the tower allows the turbine to run at a well-defined speed independently, to a wide extent, of variations of the water flow pumped in. The gear 28 may have various ratios so that more turbine speeds are possible at a generator speed resulting in a substantially fixed frequency of the power generated, for example 50 Hz.

The driving means 4 may be designed in different ways, being elongated and located with its longitudinal axis substantially at right angles to the tower axis and rotatable around it. In FIG. 1, the embodiment shown is seen in an oblique front view, meaning that the float 4 is adjusted suitably in relation to waves moving in towards the plane of the paper, slightly obliquely from the left. FIG. 2 shows it in an oblique view from behind. FIG. 1 shows that the float has a middle area 31 with a particularly large buoyancy volume for utilization of the extra water rise occurring when incoming waves hit the tower foundation. The middle area 31 interconnecting two float arms 32 is therefore placed in front of the tower, facing the incoming waves. With this design of the float, it cannot adjust itself in the position shown, as the position would be unstable, and therefore it is controlled by an electric servomotor, not shown. The motor is controlled electronically on the basis of measuring signals from a sensor which records the direction of propagation of the waves. The sensor may be a flowmeter of a known type, or it may comprise several pressure meters arranged in the water around the tower. However, the float may be designed so that it adjusts itself in a stable position with its longitudinal axis parallel with the wave crests. This happens if the float has a centre axis located behind the axis of rotation. The ability of adjustment parallel with the wave crests allows the driving means according to the invention to utilize the wave energy better than prior-art driving means, as a larger part of the water volume raised influences the driving means.

The driving means 4 may be a float which is hollow or porous, but it can also be formed as a blade, possibly with a shape like an inverted snow scraper. Such blade may be simpler and therefore cheaper to realize. In this embodiment, the downward movement of the driving means may be limited by a stop which can be adjusted in height by means of an actuator, for example a servo motor, in relation to the current water level so that the blade is kept at a suitable height for incoming waves to be able to lift the blade. This actuator may be controlled on the basis of measuring signals from a water level meter, such as a float.

The driving means 4 must be dimensioned in accordance with the predominant weather conditions on the site of construction. Thus, the length and buoyancy volume or the blade surface along the longitudinal axis of the driving means must be adapted to the wave lengths, amplitudes and frequencies that occur, a suitable compromise being chosen on the basis of the different states that occur. The driving means 4 may possibly be journalled with the possibility of limited tilting around an axis at right angles to both the longitudinal axis of the means itself and the longitudinal axis of the tower, and possibly also so as to be tiltable to a limited extent around its longitudinal axis, whereby the driving means can follow the wave movement more closely. To protect the driving means from ice formations in the winter, the outer housing of the foot section may possibly be heated to melt the ice, or the driving means may be arranged on the tower with the possibility of raising it above the ice to a non-active position. The driving means 4 described with associated pump and turbine system is, in itself, a separate invention which can be applied as a wave energy plant without a windmill, as the system can merely be mounted on its own foundation on the seabed.

The tower 2 may be surface treated on the inside and outside surfaces in a manner known per se and moreover be provided with cathodic corrosion protection.

What is claimed is:

1. A wind and wave energy plant, comprising a windmill with a rotor, a wave-actuated water pump, a turbine having a water inlet and an output shaft, and an electric generator, whereby the water pump is in fluid communication with the turbine and the output shaft of the turbine is in driving connection with the electric generator, the windmill including a tubular mill tower which is adapted to be firmly anchored to the seabed and encloses a storage tank between the sea surface and the mill rotor, which tank has a water supply through the pump via a non-return valve and is in fluid communication with the inlet of the turbine.

2. A wind and wave energy plant according to claim 1, wherein the storage tank is elongated and extends substantially from the area around the sea surface to the area at the rotor.

3. A wind and wave energy plant according to claim 1, wherein the mill tower is constituted by a slender pipe which in itself forms the wall of the storage tank.

4. A wind and wave energy plant according to claim 1, wherein the turbine and the associated electric generator are arranged in the mill tower under the storage tank.

5. A wind and wave energy plant according to claim 4, wherein the pump and the non-return valve are integral with the mill tower.

6. A wind and wave energy plant according to claim 1, wherein the mill tower has a foot section in which the turbine and the generator are arranged centrally in continuation of each other, and in which a cast foundation for the mill projects centrally in an upward direction, and that the pump is a piston pump with one or more pistons capable of moving up and down in an area enclosing one or more of the members: turbine, generator or foundation.

7. A wind and wave energy plant according to claim 1, wherein the pump is driven by a wave-actuated elongated element, which extends substantially in a diametral direction in relation to the tower, and which is journalled rotatably around the longitudinal axis of the tower at the foot section of the tower.

8. A wind and wave energy plant according to claim 7, wherein the wave-actuated elongated element has the form of a float.

9. A wind and wave energy plant according to claim 8, wherein the float, in the area around the tower, has a middle area interconnecting two float arms, and wherein the float has a larger cross-section in the middle area than at the outer ends of the float arms.

10. A wind and wave energy plant according to claim 7, wherein the plant includes a sensor (S) for recording the direction of propagation of the waves and a control system (CS) for adjusting the wave-actuated elongated element, depending on the recorded direction and by means of an actuator (A), so that the longitudinal axis of the wave-actuated elongated element is substantially parallel with the wave crests.

11. A wind and wave energy plant, according to claim 1, wherein the foundation of the tower has a downwardly increasing diameter below the sea surface.

12. A wind and wave energy plant according to claim 1, wherein the part of the external wall of the tower located at the sea surface is made of metal, and that means for electrical heating (H) of this part of the outer wall are included.

13. A wave energy plant comprising a wave-actuated water pump, a turbine having an output shaft, and an electric generator, whereby the water pump is in fluid communication with the turbine and the output shaft of the turbine is in driving connection with the electric generator, the wave energy plant including a foundation which is adapted to be firmly anchored to the seabed, whereby the pump is mounted on the foundation and is driven by a wave-actuated elongated element, which is located at the foundation and has a longitudinal axis extending substantially in a horizontal direction, and which is journalled rotatably around and displaceably along a substantially vertical axis.

14. A wave energy plant according to claim 13, wherein the wave-actuated elongated element has the form of a float.

15. A wave energy plant according to claim 13, wherein the wave-actuated elongated element has the form of a float, which, in the area around the foundation, has a middle area interconnecting two float arms, and wherein the float has a larger cross-section in the middle area than at the outer ends of the float arms.

16. A wave energy plant, according to claim 13, wherein the plant includes a sensor (S) for recording the direction of propagation of the waves and a control system (CS) for adjusting the wave-actuated elongated element, depending on the recorded direction and by means of an actuator (A), so that the longitudinal axis of the wave-actuated elongated element is substantially parallel with the wave crests.

17. A wave energy plant according to claim 13, wherein the foundation has a downwardly increasing diameter below the sea surface.

18. A wave energy plant according to claim 13, the part of the external wall of the foundation located at the sea surface is made of metal, and that means for electrical heating (H) of this part of the outer wall are included.

19. A wind and wave energy plant, comprising a windmill with a rotor, a wave-actuated water pump, a turbine having a water inlet and an output shaft, and an electric generator, whereby the water pump is in fluid communication with the turbine and the output shaft of the turbine is in driving connection with the electric generator, the windmill including a tubular mill tower which is adapted to be firmly anchored to the seabed and encloses a storage tank between the sea surface and the mill rotor, which tank has a water supply through the pump via a non-return valve and is in fluid communication with the inlet of the turbine, and the pump being driven by a wave-actuated elongated element, which extends substantially in a diametral direction in relation to the tower, and which is journalled rotatably around the longitudinal axis of the tower at the foot section of the tower.

* * * * *